(12) United States Patent
Bakx

(10) Patent No.: US 7,505,391 B2
(45) Date of Patent: Mar. 17, 2009

(54) ARRANGEMENT FOR READING AN INFORMATION CARRIER

(75) Inventor: Johannus Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 322 days.

(21) Appl. No.: 10/537,128

(22) PCT Filed: Dec. 3, 2003

(86) PCT No.: PCT/IB03/50029

§ 371 (c)(1), (2), (4) Date: Jun. 2, 2005

(87) PCT Pub. No.: WO2004/057587

PCT Pub. Date: Jul. 8, 2004

(65) Prior Publication Data

US 2006/0044989 A1    Mar. 2, 2006

(30) Foreign Application Priority Data

Dec. 20, 2002 (EP) .................................. 02080512

(51) Int. Cl.
*G11B 7/00* (2006.01)
(52) U.S. Cl. ................................................. 369/124.12
(58) Field of Classification Search ................ 709/224; 702/188; 369/124.01; 379/398, 124.12
See application file for complete search history.

(56) References Cited

U.S. PATENT DOCUMENTS

| 4,764,732 | A |  | 8/1988 | Dion |
| 4,791,668 | A | * | 12/1988 | Pringle ........................ 379/398 |
| 5,007,038 | A |  | 4/1991 | Nakane et al. |
| 5,058,130 | A | * | 10/1991 | Park ............................ 375/230 |
| 5,103,439 | A |  | 4/1992 | Bierhoff |
| 5,202,553 | A |  | 4/1993 | Geller |
| 5,270,875 | A |  | 12/1993 | Shah et al. |
| 5,382,920 | A |  | 1/1995 | Jung |
| 5,919,252 | A |  | 7/1999 | Klein |
| 6,331,919 | B1 |  | 12/2001 | Klaassen et al. |
| 6,765,858 | B2 | * | 7/2004 | Hoeven ................. 369/124.12 |
| 2003/0014515 | A1 | * | 1/2003 | Motoyama et al. .......... 709/224 |
| 2003/0216891 | A1 | * | 11/2003 | Wegener ..................... 702/188 |

* cited by examiner

*Primary Examiner*—Jeffrey Pwu
*Assistant Examiner*—Farhad Ali

(57) ABSTRACT

Disclosed is an arrangement for reading an information carrier, comprising a read head for scanning the information carrier along a scanning path and thereby generating one or more electrical signals in response to a pattern recorded along the scanning path; a signal processing unit for processing the one or more electrical signals; electrical conductors for conveying the one or more electrical signals to the signal processing unit; characterized in that the arrangement further comprises controllable termination means for terminating at least one electrical conductor with a selectable impedance, the controllable termination means comprising at least two impedances and selecting means for selecting an impedance to terminate the at least one electrical conductor. The controllable termination means can select one of the at least two impedances. This makes the arrangement according to the invention capable of tuning to varying circumstances. If for certain circumstances a high impedance is needed, then a high impedance is selected. The varying circumstances can, for instance, be the speed at which the information carrier is rotated or the type of read head that is used.

10 Claims, 5 Drawing Sheets

ARRANGEMENT FOR READING AN INFORMATION CARRIER

Figure 1:
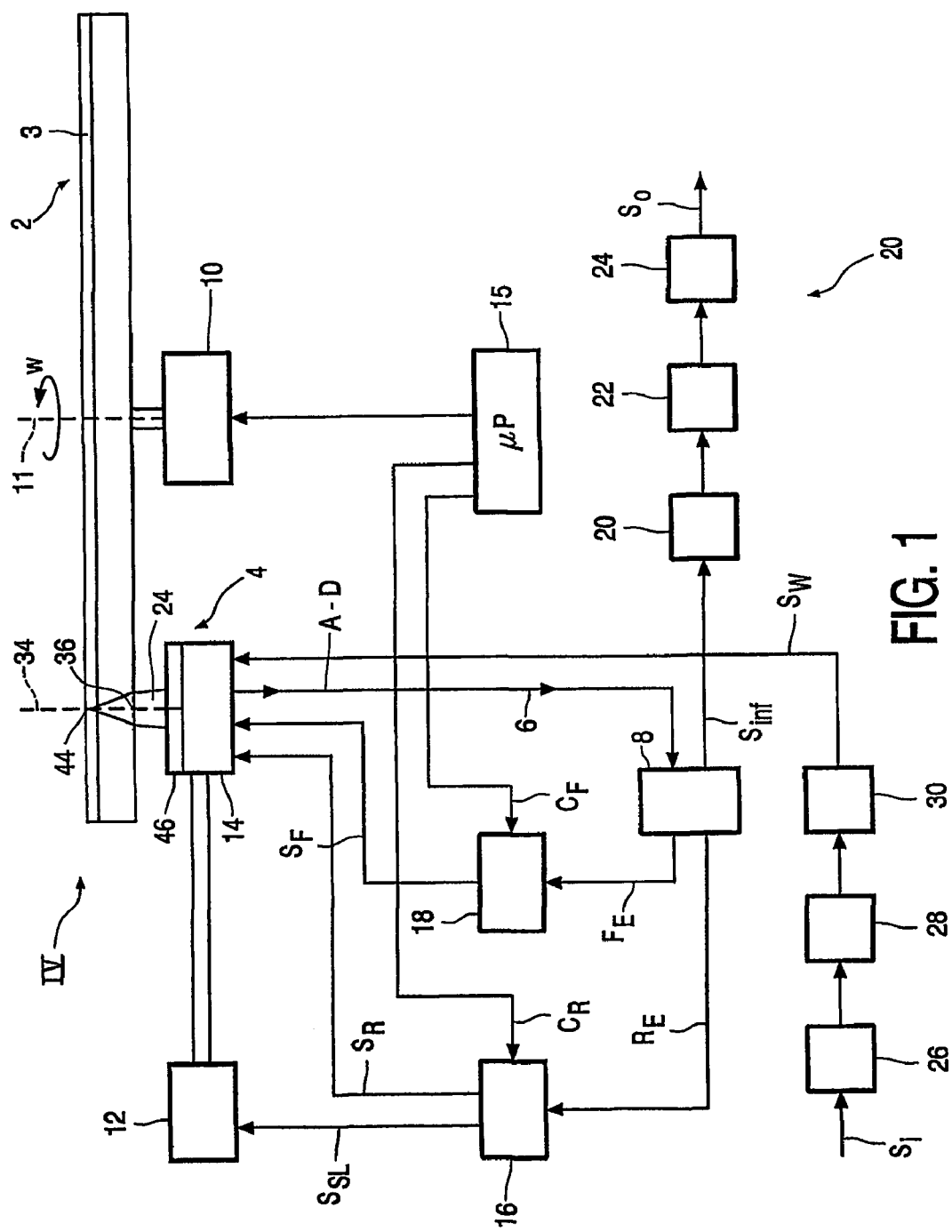

The invention relates to an arrangement for reading an information carrier, comprising a read head for scanning the information carrier along a scanning path and thereby generating one or more electrical signals in response to a pattern recorded along the scanning path;

a signal processing unit for processing the one or more electrical signals;

electrical conductors for conveying the one or more electrical signals to the signal processing unit.

The invention also relates to a signal processing unit.

An arrangement for reading an information carrier is described in U.S. Pat. No. 5,103,439. The arrangement disclosed therein is suitable for reading an optical information carrier. The read head has a radiation source for the generation of radiation, means for imaging the radiation onto a scanning spot on the information carrier and for imaging radiation that is reflected at the scanning spot onto a detector. The detector has a first to fourth sub-detector and a current-voltage converter for the generation of voltage signals in response to current signals generated by the sub-detectors. In practical versions of the known arrangement the transimpedance amplifier is coupled to a signal processing unit via a flexible cable. From the signals supplied by the current-voltage converter this unit derives an information signal, as well as error signals for servo systems for the control of the position of the read head and of the focussing of the scanning spot.

The known arrangement has the disadvantage that it is not able to tune to varying circumstances.

For instance, at high speeds, for example 10 to 20× DVD, disturbing reflections may appear at the input of the signal processing unit, as a result of which the signals conveyed via the flexible cable are unreliable. The reflections may be counteracted by terminating the respective conductors of the flexible cable with a resistive impedance near the input of the signal processing unit. However, this gives rise to a substantial increase of the load of the current-voltage converter. Therefore, at low speeds where less disturbing reflections appear, it is favorable to have a higher impedance than at high speeds.

Furthermore, the read head with the detectors of one manufacturer may have to be coupled with a signal processing unit of an other manufacturer. These two components then have to be matched to guarantee a good performance. However, the impedance with which the flexible cable is terminated is fixed, providing no flexibility to match the two components. For instance, there are read heads which provide current outputs instead of voltage outputs. These current outputs have to be terminated by impedances to convert the currents into voltages. The amplitude of the voltage is dependent on the value of the impedances. Therefore the impedance has to be matched to the amplitude of the current. However, if subsequently an information carrier is read which has a reflectance less than normal, the amplitude of the voltage over the impedance might be insufficient.

It is an object of the invention to provide an arrangement of the type defined in the opening paragraph, which is able to tune to varying circumstances.

To this end, the arrangement in accordance with the invention is characterized in that the arrangement further comprises controllable termination means for terminating at least one electrical conductor with a selectable impedance, the controllable termination means comprising at least two impedances and selecting means for selecting an impedance to terminate the at least one electrical conductor.

The controllable termination means can select one of the at least two impedances. This makes the arrangement according to the invention capable of tuning to varying circumstances. If for certain circumstances a high impedance is needed, then a high impedance is selected. The varying circumstances can, for instance, be the speed at which the information carrier is rotated or the type of read head that is used.

The controllable termination means can be incorporated in the signal processing unit. This has the advantage that less components are needed on the printed circuit board on which the signal processing unit is installed.

In a further embodiment of the invention the controllable termination means are able to terminate two or more electrical conductors with different selectable impedances. The different electrical conductors convey different signals. The different electrical conductors might therefore require different optimal impedances, dependent on characteristics of the conveyed signals. With this embodiment the different conductors can be terminated with different impedances.

In these embodiments of the invention it is preferable that at least one of the selectable impedances comprise a characteristic impedance of the electrical conductors. This is advantageous when reading is performed at high speeds. The disturbing reflections that may appear at the input of the signal processing unit are suppressed when terminating the electrical conductors with characteristic impedances. With characteristic impedance is meant an impedance near the impedance of the electrical conductors themselves.

In a further embodiment the controllable termination means are able to select the characteristic impedance when reading the information carrier at a relatively high speed and select a higher impedance when reading the information carrier at a relatively low speed. In this way the disturbing reflections are suppressed at high speeds and at lower speeds the impedance is higher resulting in a lower power consumption.

The detectors on the read head output currents. These currents can be converted on the read head by current to voltage converters and subsequently conveyed by the electrical conductors to the signal processing unit. There are also read heads where the conversion to voltages is not performed and the current outputs are conveyed by the electrical conductors. In a further embodiment of the invention the one or more of the electrical signals are current outputs and the selectable impedance functions as a current to voltage converter. The current output can be variable due to for instance aging of the read head or temperature fluctuations. This results in a fluctuating amplitude of the voltage over the impedances. The controllable termination means can adapt to fluctuations in the current by changing the impedance and thereby counteracting the fluctuations in the amplitude of the voltage over the impedance.

In a further refinement of the previous embodiment the read head performs the scanning by transmitting a radiation beam to the information carrier and receiving a reflected radiation beam from the information carrier, and the arrangement further comprises measuring means for measuring the reflectance of the radiation beam, and the controllable termination means selects an impedance dependent on the measured reflectance of the radiation beam. The amount of radiation that is reflected by an information carrier can vary from information carrier to information carrier. When an information carrier reflects a large amount of the radiation beam then the current produced by the detectors is large. Subsequently the voltage over the impedance is high. If this voltage is too high for the signal processing means the controllable termination means can reduce the voltage by selecting a lower impedance. However, when an information carrier reflects a small amount of the radiation beam then the current produced by the detectors is small. Subsequently the voltage over the impedance is low. If this voltage is too low for the signal processing means the controllable termination means can increase the voltage by selecting a higher impedance. Also the reflectance of an information carrier can change within one information carrier. DVD discs for instance, can have two information layers. One information layer can have a higher reflectivity than the other information layer. The amplitude of the voltage at the input of the signal processing means than varies from one information layer to the other information layer. This variation can be reduced by selecting a higher impedance for the information layer with a lower reflectivity as compared with the impedance selected for the information layer with a higher reflectivity.

In an advantageous embodiment at least one electrical conductor is terminated with a selectable impedance which is selected by optimizing one or more parameters of the electrical signal conveyed by the at least one electrical conductor. The impedance has an influence on one or more parameters of the electrical signal. For instance, the impedance influences the amplitude of the electrical signal. By selecting an appropriate impedance the amplitude of the electrical signal can be optimized. Other parameters that can be influenced by the impedance are for instance jitter of the electrical signal and overshoot of that electrical signal. Of course, the impedance can be selected on the basis of two or more of the parameters of the electrical signal.

A signal processing unit which has the controllable termination means according to the invention incorporated is advantageous in that it can be easily used for different kinds of read heads. Because of the controllable termination means it can be matched to a certain read head. Also during operation the controllable termination means can adjust the impedance to tune to changing circumstances in the manner as described in the previous embodiments.

Figure 2:
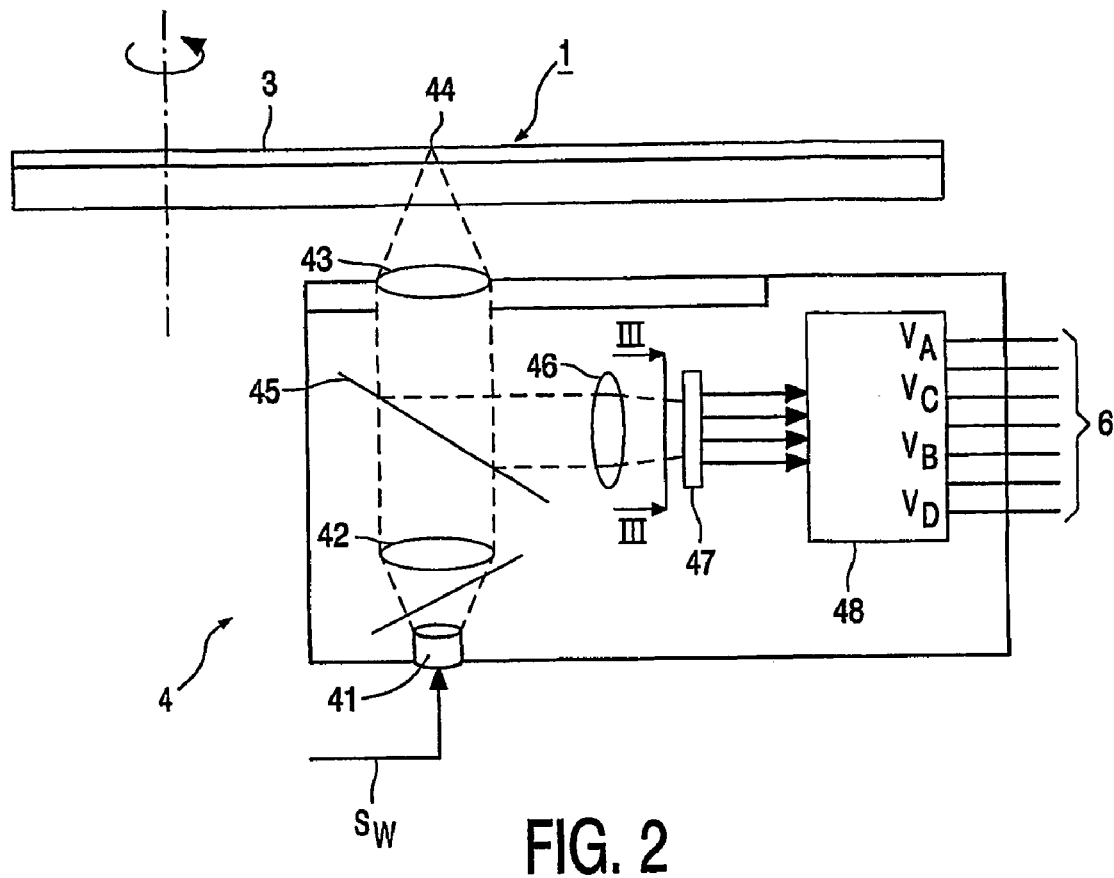
Figure 3:
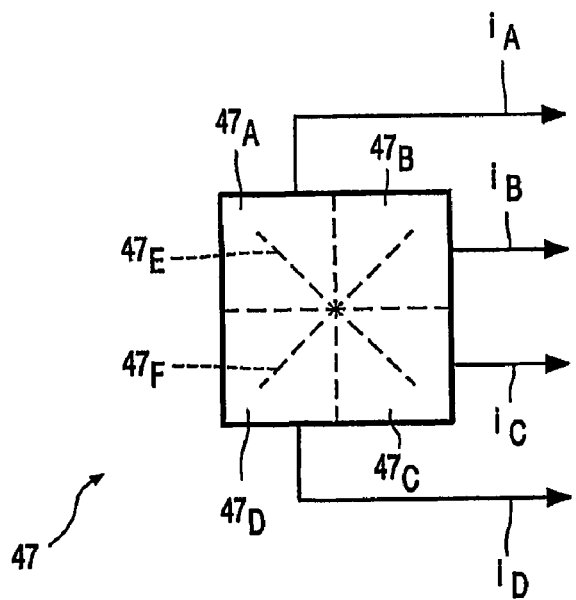
Figure 4:
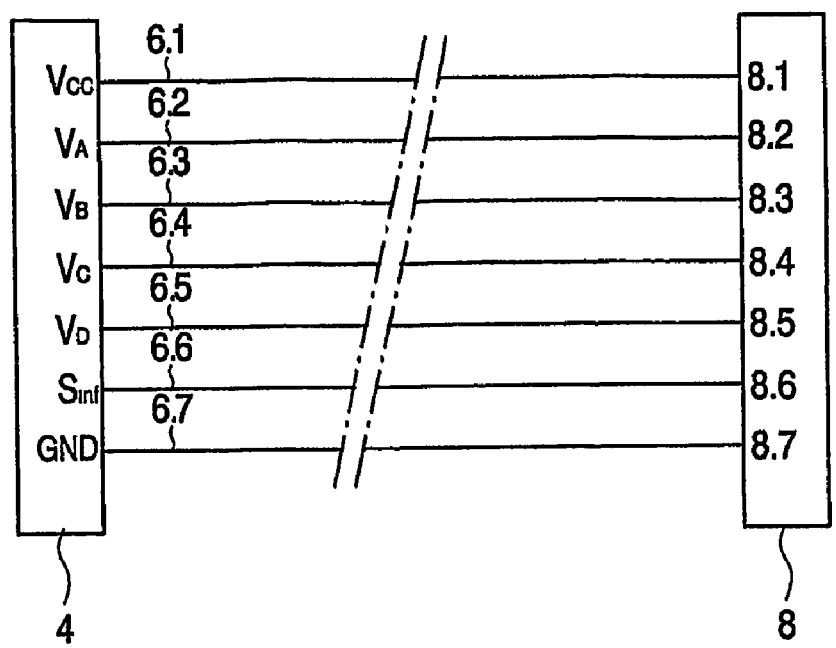
Figure 5:
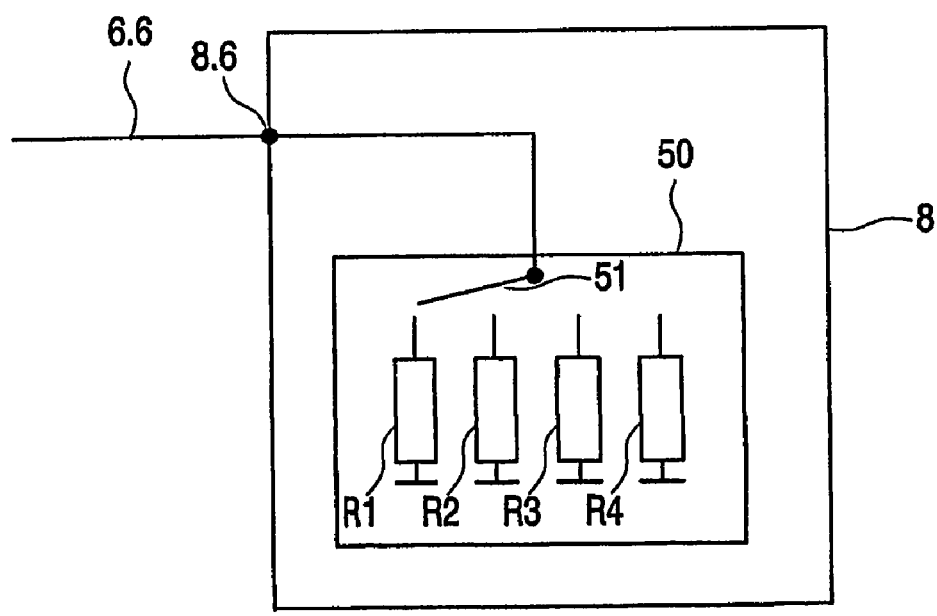
Figure 6:
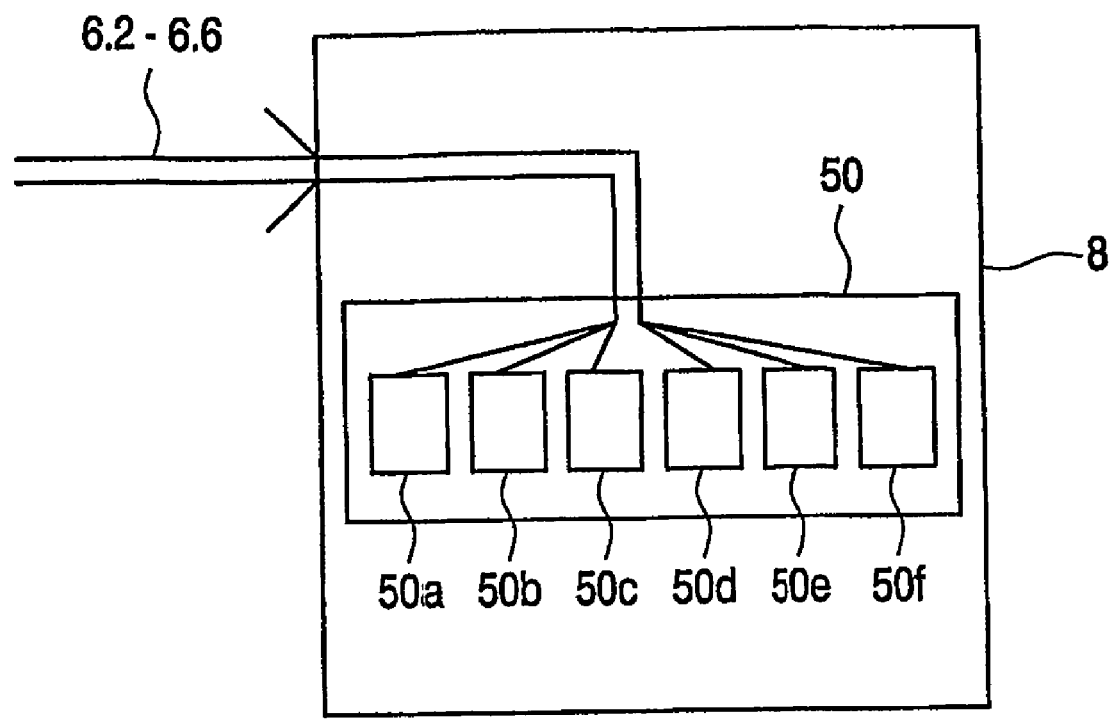
Figure 7A:
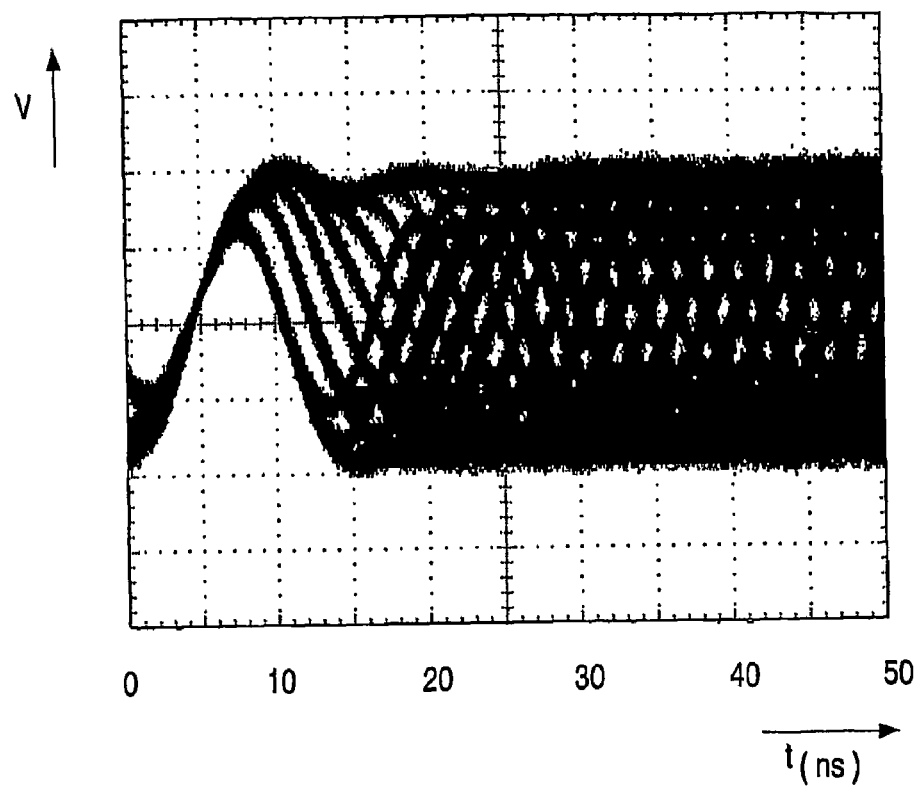
Figure 7B:
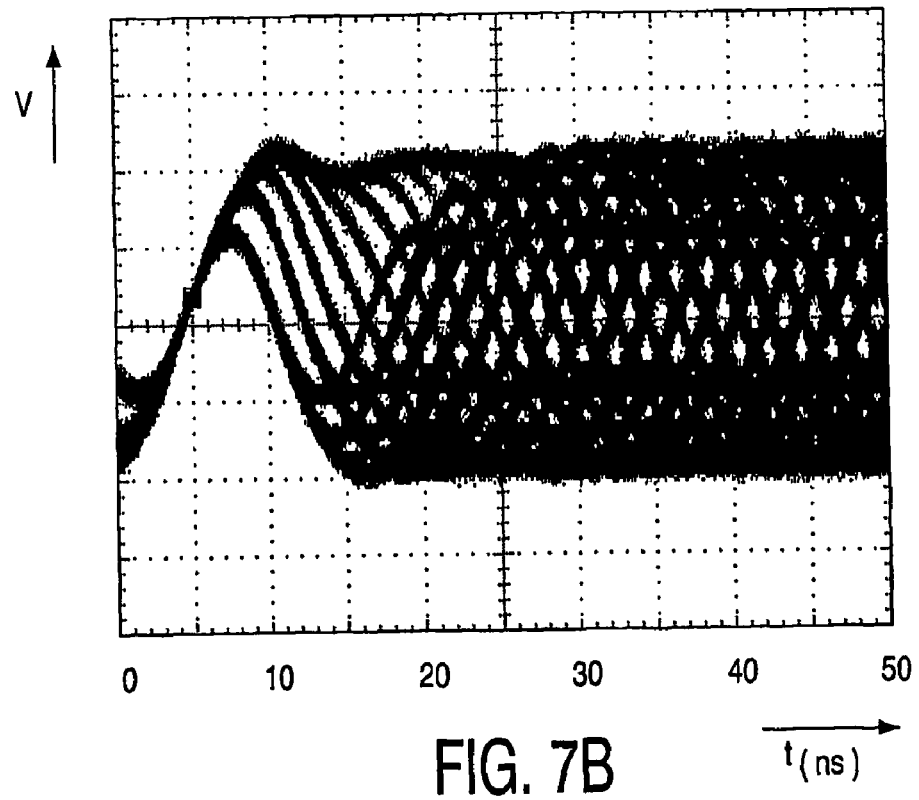

These and other aspects of the invention will be described in more detail with reference to the drawings. In the drawings FIG. 1 shows an example of an arrangement for reading an information carrier, FIG. 2 shows a part of the arrangement shown in FIG. 1, FIG. 3 shows a detail of said part at III-III in FIG. 2, FIG. 4 schematically shows the electrical conductors between the read head and the signal processing unit, FIG. 5 shows an example of a signal processing unit comprising controllable termination means, FIG. 6 shows an other example of a signal processing unit comprising controllable termination means, FIG. 7A shows a signal measured when the electrical conductor conveying the signal is not terminated with a characteristic impedance, and FIG. 7B shows a signal measured when the electrical conductor conveying the signal is terminated with a characteristic impedance.

FIG. 1 shows an arrangement for reading an information carrier 2. In the present case, the arrangement is adapted to read an optical information carrier 2. The arrangement shown includes a read head 4 for scanning the information carrier 2 along a scanning path and thus generating one or more electrical signals A-D in response to a physical pattern recorded along the scanning path. The scanning paths of optical information carriers generally take the form of tracks which extend substantially concentrically around the center of the information carrier 2. The track may form, for example, concentric circles around the center or may together form a spiral whose center coincides with said center of the information carrier. As an alternative, the information carrier may take the form of a card, the tracks being provided on a strip and extending in the longitudinal direction of the strip.

An example of the read head will be described in more detail with reference to FIG. 2 and FIG. 3. The read head of FIG. 2 has a radiation source 41 for the generation of radiation. The read head 4 further has imaging means 42, 43 for imaging the radiation onto the information carrier 2 as a scanning spot 44. The read head 4 further includes imaging means 43, 45, 46 for imaging radiation that leaves the scanning spot 44 onto an optical detector 47. Said imaging means may include, for example, lenses, prisms, lattices, mirrors etc. In the present example, the imaging means comprise a convergent lens 42 and the focusing objective 43 to image the radiation beam generated by the radiation source 41 as a scanning spot. Furthermore, a semitransparent mirror 45 is interposed between the convergent lens 42 and the focusing objective 43. Radiation which is reflected from the scanning spot 44 is imaged onto an optical detector 47 via the focusing objective 43, the semitransparant mirror 45 and an astigmatic element 46. The optical detector 47, shown in more detail in FIG. 3 comprises four sub-detectors $47_A$, $47_B$, $47_C$ and $47_D$. The four sub-detectors $47_{A-D}$ each generate a current signal $i_A, i_B, i_C, i_D$ which is indicative of an intensity of the radiation that is incident on the relevant sub-detector. A current-voltage converter 48 converts the current signals $i_{A-D}$ into voltage signals $V_{A-D}$. The arrangement further includes electrical conductors 6 for transferring the one or more electrical signals $v_{A-D}$ to a signal processing unit 8.

To scan the information carrier 2 the arrangement has means for bringing about a relative movement of the scanning spot 44 with respect to the information carrier 2. The means include tangential positioning means 10 and radial positioning means 12, 14. The tangential positioning means are formed by a motor 10 for rotating the information carrier 2 about an axis 11. The motor is controlled by a microprocessor 15. The radial positioning means 12, 14 comprise coarse and fine positioning means. In the present case, the coarse positioning means are constructed as a slide 14 which is movable by means of a motor 12. The fine radial positioning means are adapted to move the scanning spot 44 with respect to the read head. The last-mentioned means are not shown herein for the sake of clarity. The coarse and the fine radial positioning means are controlled by control signals $S_{SL}$ and $S_R$ from a radial servo system. For this purpose, the radial servo system 16 receives a radial error signal $R_E$ from the signal processing unit and a control signal $C_R$ from the microprocessor 15. The arrangement further has an axial servo system 18 for focussing the scanning spot 44 onto a plane of the information carrier 2. For this purpose, the axial servo system 18 generates a control signal $S_F$ in response to a focus error signal $F_E$ from the signal processing unit 18 and a control signal $C_F$ from the microprocessor 15.

The signal processing unit 8 further generates an analog information signal $S_{inf}$ from the voltage signals $V_A$-$V_D$. From this information signal a detector 20, for example a Viterbi detector or a threshold detector, generates a binary signal. From this signal a channel decoding unit 22 and an error correction decoding unit 24 consecutively generate an output signal $S_o$ which is a reconstruction of the information recorded on the information carrier 2. The analog information signal $S_{inf}$ can alternatively be generated on the read head before the signals are conveyed by the electrical conductors. In that case the signals $V_A$-$V_D$ and $S_{inf}$ are conveyed by the electrical conductors.

The disclosed arrangement is also suitable for writing information onto an information carrier 2. For this purpose, the arrangement includes an error correction encoding unit 26 and a channel encoding unit 28. The error correction code is for example CIRC. The channel code is for example EFM. The signal generated by the channel encoding unit 28 is supplied to a write strategy generator 30. In response thereto, this generator generates a write signal $S_W$, by means of which the radiation source 41 is controlled.

In FIG. 4 the electrical conductors 6.1-6.7 for conveying the electrical signals $V_{CC}$, $V_A$-$V_D$, $S_{inf}$ and GND from the read head 4 to the signal processing unit 8 are schematically depicted. In this example the analog information signal $S_{inf}$ is generated by the read head. The signal processing unit 8 comprises the controllable termination means 50 as depicted in FIG. 5. Here the analog information signal $S_{inf}$ is conveyed by the electrical conductor 6.6 to input 8.6 of the signal processing unit 8. The analog information signal $S_{inf}$ is fed to the controllable termination means 50. The controllable termination means 50 comprise selecting means 51. The selecting means 51 can select different impedances to terminate the electrical conductor 6.6. In this example the electrical conductor can be terminated by impedances R1 to R4. The controllable termination means 50 can also terminate more than one electrical conductor 6.1-6.6 with an impedance having the same value. For example, the conductors 6.2 to 6.6 can be terminated by an impedance having value R1. When the selecting means 51 select a different impedance value (R2), then all the conductors 6.2 to 6.6 are terminated by an impedance having value R2. Alternatively, the controllable termination means 50 can terminate two or more electrical conductors with different impedances. This is schematically depicted in FIG. 6. Here the electrical conductor 6.2 to 6.6 are fed to controllable termination means 50 which comprise sub-termination means 50a to 50f which enable the controllable termination means 50 to terminate the electrical conductors 6.2 to 6.6 with different impedances. The electrical signals conveyed by the electrical conductors can have different characteristics. For instance, one electrical signal can be a current output and an other electrical signal can be a voltage output. In the case of the current output, the impedance preferably has a value such that the resulting voltage over the impedance is within certain boundaries. In the case of the voltage output, the impedance preferably either has a value such that disturbing reflections are suppressed or the impedance has a value such that the power consumption is within limits.

It is favorable that the controllable termination means 50 are able to select a characteristic impedance when reading the information carrier 2 at a first speed and select a higher impedance when reading the information carrier 2 at a second speed which is lower than the first speed. At a relatively high speed the electrical signals coming from the read head 4 have relatively high frequencies. When these electrical signals are conveyed by the electrical conductors then disturbing reflections can result at the other end of the electrical conductors. To suppress these reflections, the electrical conductor preferably is terminated with a characteristic impedance. However this is a relatively low impedance. When reading at lower speeds, there are less disturbing reflections. Then it becomes more important to reduce power consumption. At these lower speeds it is preferable to terminate the electrical conductors with relatively high impedances. Thus, in applications where low power consumption is required, but also a good performance at high reading speeds, the invention is very advantageous. To show what the improvement is when terminating for instance the analog information signal $S_{inf}$ with a characteristic impedance, the eye patterns of the analog information signal $S_{inf}$ is shown in FIG. 7a and FIG. 7b. In FIG. 7a the electrical conductors are not terminated with a characteristic impedance, and in FIG. 7b with a characteristic impedance. The FIGS. 7a and 7b show that the measure in accordance with the invention distinctly improves the perceptibility of the eye pattern. Consequently, the detectability of the analog information signal $S_{inf}$ has also improved.

The invention is not limited to the embodiment described herein. Within the scope of the claims many variants are conceivable to one skilled in the art. In another embodiment the arrangement is adapted to read, for example, optical maps. In that case, the arrangement has, for example, a first and a second linear motor, the first linear motor moving the head in a first direction and the second linear motor moving the information carrier in a second direction perpendicular thereto. Yet another variant of the arrangement in accordance with the invention is adapted to read, for example, information carriers. in the form of a tape. In that case, the arrangement has, for example, a first drive means for moving the tape in a longitudinal direction and second positioning means for moving the read head in a direction perpendicular thereto. It is obvious that the information carrier need not be based on an optical medium but may alternatively include a magnetic or a magneto-optical medium.

The invention claimed is:

1. An arrangement for reading an information carrier, said arrangement comprising:
   a read head for scanning the information carrier along a scanning path and thereby generating one or more electrical signals in response to a pattern recorded along the scanning path;
   a signal processing unit for processing the one or more electrical signals; and
   electrical conductors for conveying the one or more electrical signals to the signal processing unit,
   wherein the arrangement further comprises controllable termination means for terminating at least one electrical conductor with a selectable impedance, the controllable termination means comprising at least two impedances and selecting means for selecting an impedance to terminate the at least one electrical conductor,
   wherein the read head performs the scanning by transmitting a radiation beam to the information carrier and receiving a reflected radiation beam from the information carrier,
   wherein the arrangement further comprises measuring means for measuring the reflectance of the radiation beam,
   and wherein the controllable termination means selects an impedance dependent on the measured reflectance of the radiation beam.

2. The arrangement as claimed in claim 1, characterized in that the signal processing unit comprises the controllable termination means.

3. The arrangement as claimed in claim 1, characterized in that the selectable impedance comprises a characteristic impedance of the electrical conductors.

4. The arrangement as claimed in claim 1, characterized in that the controllable termination means is able to terminate two or more electrical conductors with different selectable impedances.

5. The arrangement as claimed in claim 3, characterized in that the controllable termination means selects the characteristic impedance when reading the information carrier at a relatively high speed, and selects a higher impedance when reading the information carrier at a relatively low speed.

6. The arrangement as claimed in claim 1, characterized in that one or more of the electrical signals are current outputs and in that the selectable impedance functions as a current to voltage converter.

7. An arrangement for reading an information carrier, said arrangement comprising:
 a read head for scanning the information carrier along a scanning path and thereby generating one or more electrical signals in response to a pattern recorded along the scanning path;
 a signal processing unit for processing the one or more electrical signals; and
 electrical conductors for conveying the one or more electrical signals to the signal processing unit,
 wherein the arrangement further comprises controllable termination means for terminating at least one electrical conductor with a selectable impedance, the controllable termination means comprising at least two impedances and selecting means for selecting an impedance to terminate the at least one electrical conductor,
 characterized in that at least one electrical conductor is terminated with a selectable impedance which is selected by optimizing one or more parameters of the electrical signal conveyed by the at least one electrical conductor.

8. The arrangement as claimed in claim 7, characterized in that the one or more parameters comprise jitter of one or more electrical signals.

9. The arrangement as claimed in claim 7, characterized in that the one or more parameters comprise an amplitude of one or more electrical signals.

10. The arrangement as claimed in claim 7, characterized in that the one or more parameters comprise an overshoot of one or more electrical signals.

* * * * *